United States Patent [19]

Del Fabbro

[11] Patent Number: 4,590,361
[45] Date of Patent: May 20, 1986

[54] FOOD FRYING APPARATUS INCLUDING INDIRECT OIL HEATER

[75] Inventor: Claudio Del Fabbro, Porcia, Italy

[73] Assignee: Zanussi Grandi Impianti S.p.A., Pordenone, Italy

[21] Appl. No.: 739,303

[22] Filed: May 29, 1985

[30] Foreign Application Priority Data

Oct. 10, 1984 [IT] Italy .............................. 34061/84[U]

[51] Int. Cl.⁴ .......................................... F27D 11/00
[52] U.S. Cl. ...................... 219/439; 99/330; 99/409; 126/387; 219/325; 219/365; 219/369; 219/388; 219/430; 219/438; 219/530; 366/279; 366/315
[58] Field of Search .............. 219/325, 331, 388, 365, 219/400, 430, 436, 437, 438, 439, 440, 441, 521, 530; 99/330, 331, 408, 409, 410; 126/373, 374, 386, 387; 366/241, 279, 282, 292, 315

[56] References Cited

U.S. PATENT DOCUMENTS

| | | | |
|---|---|---|---|
| 3,159,344 | 12/1964 | Wilson | 219/438 X |
| 3,455,232 | 7/1969 | Oliver, Jr. | 219/438 X |
| 3,549,860 | 12/1970 | Parker et al. | 219/400 |
| 3,636,308 | 1/1972 | Hatch | 219/439 |
| 3,681,567 | 8/1972 | Boecher | 219/365 |
| 3,878,360 | 4/1975 | Augustine et al. | 219/441 X |
| 3,919,523 | 11/1975 | Wadia et al. | 219/441 X |
| 3,971,307 | 7/1976 | Graham | 99/403 |
| 4,145,604 | 3/1979 | Carlsson | 219/439 |
| 4,324,173 | 4/1982 | Moore et al. | 99/330 |
| 4,444,095 | 4/1984 | Anetsberger et al. | 99/408 |

FOREIGN PATENT DOCUMENTS

| | | | |
|---|---|---|---|
| 592734 | 5/1925 | France | 219/439 |
| 355875 | 9/1961 | Switzerland | 219/439 |

Primary Examiner—Volodymyr Y. Mayewsky
Attorney, Agent, or Firm—Wenderoth, Lind & Ponack

[57] ABSTRACT

A food frying apparatus includes a housing having a front side, a vessel mounted within the housing to contain oil, the vessel having an expansion zone adjacent the front side, and an oil heating container connected to the vessel, the container being positioned adjacent the front side and in communication with the expansion zone. An electrical heater is mounted on the exterior of the container to indirectly heat oil therein. The oil is forcibly circulated between the vessel and the container by means of a motor mounted beneath the container and a rotor coaxially mounted within the container and coupled to the motor. A plug is axially insertable into the top of the container, and an upper end of the rotor is connected to the plug for axial movement therewith. The rotor has a lower end connected to the motor to enable relative telescopic sliding movement therebetween to achieve coupling or uncoupling. The axial length of coupling between the motor and the lower end of the rotor is less than the axial length of movement of the plug to remove the plug from the container top.

13 Claims, 4 Drawing Figures

FOOD FRYING APPARATUS INCLUDING INDIRECT OIL HEATER

BACKGROUND OF THE INVENTION

The present invention relates to a food frying apparatus or utensil, particularly for use in a large size kitchen, such as a commercial kitchen. The present invention particularly is directed to such an apparatus which is of the type having an electric heater for the indirect heating of the frying oil or fat.

Traditionally, an electric frying apparatus has included a vessel, for example formed of stainless steel, a rear portion of which has at least one armored resistance heater hingedly mounted or guided in a manner such that during operation its active heater portion is completely immersed in the frying oil. In this manner, there is achieved direct heating of the oil. However, due to the low heat transmission coefficient between the surface of the heater and the oil, there occurs a substantial temperature difference of as much as 100° C. or more between the heater surface and the oil. As a result, the oil in contact with the heater surface is subjected to a great amount of heat and therefore is subjected to degradation which, in addition to rendering cleaning of the resistance heater difficult, converts some of the oil to substances which constitute particular health hazards.

One attempt to solve such problems of a conventional electric frying apparatus has involved increasing the heat transmitting surface area of the resistance heater in proportion to its capacity, thereby to attempt to reduce the temperature difference between the heater surface and the oil to more acceptable values. This solution however requires the employment of a resistance heater having excessive dimensions and intricate shapes. This complicates the design, use and, above all, the frequency and difficulty of periodic cleaning of the apparatus.

A further attempt to solve the above problems has involved inserting an agitator into the oil, thereby to reduce such temperature and to prevent the excessive heating of the oil when in direct contact with the heater surface. This solution however only complicates the construction of the apparatus without eliminating the difficulties with regard to cleaning, since the resistance heater always is immersed in the oil during use of the apparatus.

Recently, it has been proposed to eliminate the above traditional difficulties by providing for indirect heating of the oil. In this arrangement, the oil is heated in a separate container which communicates with the vessel of the frying apparatus. There is provided means for forcibly circulating the oil between the vessel and the container. Electrical resistance heaters are wound onto the outer wall surface of the container in intimate contact therewith, for example by being welded or soldered thereto. This solution is advantageous in that it reduces certain of the shortcomings of frying apparatus provided with direct heating, due to the strong turbulence occurring in the heat exchange zone and resulting in a reduction of the temperature difference between the oil and the heating surface. On the other hand, attempts at this solution have resulted in certain other structural and functional difficulties. Specifically, the heating container is usually disposed vertically and therefore is required to have a substantial axial length, thus occupying a considerable vertical space below the bottom of the vessel. Additionally, the container has to be provided with an element mounted within the container for agitating and circulating the oil, and such element has to be driven by an externally mounted motor. To avoid problems with regard to sealing of a rotating shaft extending into the container, the motor is mounted above the level of the oil in the frying vessel. However, as a practical matter such motor location is not readily accessible and causes design and operating problems. Yet further, it is necessary to attempt to provide optimum conditions and ease for cleaning the container and particularly the circulating means. This however is practically not possible with the motor mounted at an elevated position.

SUMMARY OF THE INVENTION

With the above discussion in mind, it is an object of the present invention to provide a food frying apparatus of the type including an indirect oil heater, whereby it is possible to overcome the above and other prior art disadvantages.

It is a further object of the present invention to provide such an apparatus wherein the oil heating container is efficiently and rationally integrated into the overall design of the apparatus, and wherein the means for circulating the oil is conveniently provided in a manner and location ensuring proper operation of the apparatus and easy maintenance and cleaning thereof.

These and other objects of the present invention are achieved in accordance with the present invention by the provision of a food frying apparatus including a housing having a front side accessible to the exterior for cleaning and maintenance, and a vessel mounted within the housing and adapted to contain oil for the frying of food, the vessel having an expansion zone adjacent the front side for containing and accumulating foam resulting from frying. The oil heating container is connected to the vessel and is positioned adjacent the front side and is in communication with the expansion zone of the vessel. Electric heating means is mounted on the exterior of the container to indirectly heat oil contained therein. Means is provided for forcibly circulating oil between the vessel and the container, such that oil to be heated is passed from the vessel to the container, and heated oil is passed from the container to the vessel. The circulating means comprises a motor mounted beneath the container, and a rotor coaxially mounted within the container and operatively coupled to the motor to be rotated thereby within the container. Furthermore, the present invention provides means for removably mounting the rotor within the container and coupling the rotor to the motor in a manner to ensure that the rotor is uncoupled from the motor prior to disconnection of the rotor from the container, thereby avoiding danger to the operator of the apparatus. Specifically, a plug is axially slidably insertable into and removable from the top of the container between closed and open positions. The rotor has an upper end which is connected to the plug in a manner to enable relative rotation therebetween but to prevent relative axial movement therebetween. The rotor further includes a lower end connected to the motor, for example to a rotating shaft thereof, in a manner to enable relative axial movement of the rotor with respect to the motor between engaged and disengaged positions and to prevent relative rotary movement therebetween in the engaged position. Thus, the lower end of the rotor is axially telescopically movable with respect to the motor, for example with respect to a rotatable shaft thereof, such that the rotor may be axially slidably coupled to or uncoupled from the motor shaft. When engaged or coupled, relative rotation between the rotor and motor shaft is prevented, such that rotation of the motor shaft causes rotation of the rotor. Furthermore, when the plug is axially removed from the container top, the rotor is pulled therewith. The axial length of the engagement position between the motor shaft and the lower end of the rotor is less than the axial length of movement of the plug between the closed and open positions of the container. In other words, by this arrangement the rotor always is disconnected from the motor shaft before the plug is removed from the container top. Accordingly, there is no danger of agitation and thereby potential splashing of the hot oil when the top of the container is opened.

By the above features of the present invention, there is produced a significant turbulence of the oil in the heat exchange zone. This reduces the extreme heating, and resultant degradation, of the oil directly in contact and close to the heat exchange surface. It will be apparent that such feature will be more noticeable the greater the number of agitating vanes of the rotor and the closer are such vanes to the heat exchange wall of the container. On the other hand, to obtain a maximum of this advantage would require an extremely accurate and thus costly rotor construction. Furthermore, a great number of agitating vanes on the rotor would induce the entire mass of oil within the container to rotate. This would reduce the pumping effect of the rotor, thereby resulting in reduced circulation and excessive agitation of the oil, with the consequent oxidation thereof due to the formation of excessive air bubbles.

Accordingly, in accordance with a further feature of the present invention there is provided a rotor of very simple construction and which is designed to be mounted and serviced in a simple manner, while being capable of producing maximum turbulence in the circulating oil solely or at least substantially in the zone immediately adjacent the inner wall of the heating container. That is, the rotor of the present invention has a design to achieve maximum turbulence of the oil only in the peripheral area immediately adjacent the heat exchange surface, without creating substantial turbulence in the remainder of the oil. Thus, the rotor according to the invention includes a central shaft, a plurality of vanes connected to the shaft and extending generally radially therefrom, and a plurality of rods mounted to extend substantially parallel to the shaft and to rotate therewith at positions closely adjacent the inner heat exchange surface of the container. It has been found that this rotor structure makes it possible to prevent undue or excessive heating of the oil directly in contact with or closely adjacent the heat exchange surface of the container, thereby reducing the possibility of degradation of the quality of the oil.

BRIEF DESCRIPTION OF THE DRAWINGS

Other objects, features and advantages of the present invention will be apparent from the following detailed description, with reference to the accompanying drawings, wherein.

DETAILED DESCRIPTION OF THE INVENTION

Figure 1:
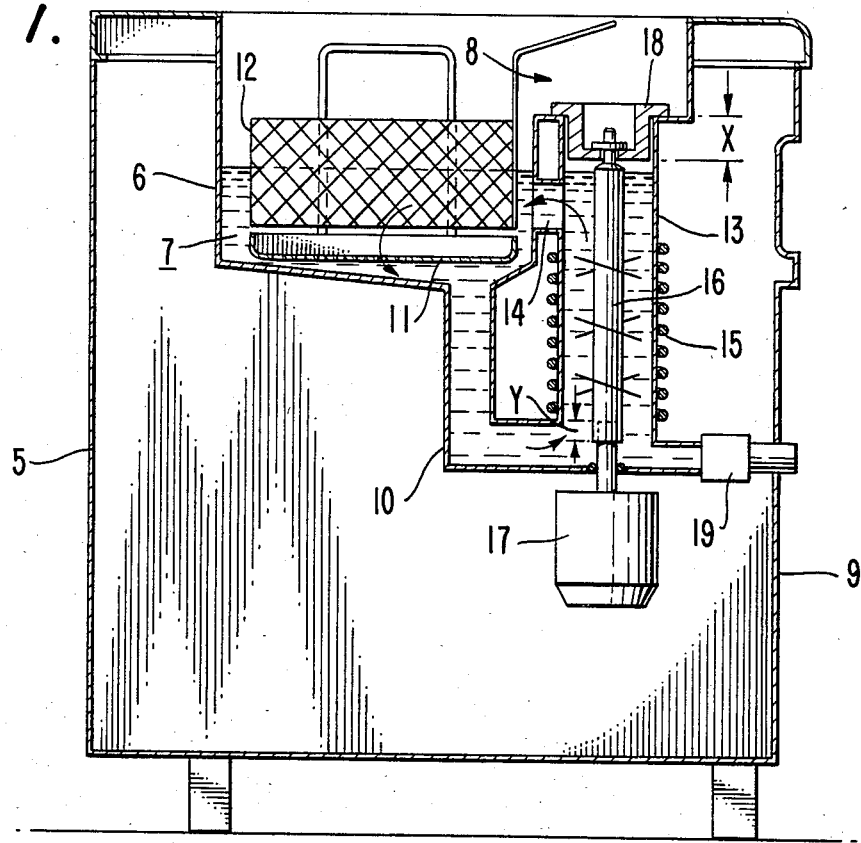
FIG. 1 a diagrammatic view of an apparatus according to a preferred embodiment of the present invention.

The food frying apparatus shown in FIG. 1 includes a housing 5 having a front side 9 accessible to the exterior for enabling cleaning and maintenance of the apparatus. A vessel 6, for example formed of stainless steel, is mounted within housing 5 to contain an oil bath 7 for the frying of food, for example by immersing a food containing container 12 in the oil bath. Vessel 6 has an expansion zone 8 adjacent front side 9. As employed herein, the term "expansion zone" 8 refers to a portion of vessel 6 destined to contain foam formed during the frying operating and extending from the level of oil bath 7 to an overflow level. The bottom of vessel 6 converges downwardly to the opening of a discharge conduit 10, and a filter 11 is positioned at the inclined vessel bottom above the opening of discharge conduit 10.

Connected to vessel 6 is a container 13 positioned adjacent front side 9 and in communication with expansion zone 8. Electric resistance heaters 15 are wound about the outer surface of container 13 and may be secured thereto by welding or soldering. Positioned coaxially within container 13 is a rotor, for example in the form of a vaned shaft 16. The lower end of container 13 communicates with discharge conduit 10, and the upper end of container 13 is connected to vessel 6 by a conduit 14. A motor 17 is mounted beneath container 13 and rotates the rotor, thereby causing circulation of the oil as indicated by the arrows in FIG. 1. Specifically, oil to be heated is transferred from vessel 6 to the bottom of container 13 via discharge conduit 10, and heated oil is transferred from container 13 to vessel 6, at a level below the oil level therein, via conduit 14. The rotor thus forcibly circulates the oil between the vessel and the container.

In accordance with a further feature of the present invention, the rotor is mounted within the container 13 and is coupled to motor 17 in a manner to ensure easy cleaning and maintenance, while at the same time preventing dangerous splashing of heated oil by requiring that the rotor is uncoupled from the motor 17 prior to disconnection of the rotor from container 13. Thus, a plug 18 is axially slidably insertable into and removable from the top of container 13 between closed and open positions thereof. The rotor has an upper end which is connected to plug 18 in a manner to enable relative rotation therebetween but to prevent relative axial movement therebetween. In other words, the rotor is allowed to rotate with respect to plug 18, but upon removal of plug 18 from the top of container 13 the rotor moves with the plug. The rotor also has a lower end connected to the motor 17, and specifically to a rotating shaft thereof, in a manner to enable relative axial movement of the rotor with respect to the motor shaft between engaged and disengaged positions, but to prevent relative rotary movement therebetween when in the engaged position. In other words, when the rotor and motor shaft are in engagement, rotation of the motor shaft is transmitted to the rotor. However, the rotor is easily axially telescopically movable with respect to the motor shaft, thereby enabling the rotor to be coupled to or uncoupled from the motor shaft. Furthermore, the axial length Y of the engagement position between the motor shaft and the lower end of the rotor is less than the axial length X of movement of plug 18 between the inserted closed position thereof, shown in FIG. 1, and a position removed from and opening the upper end of container 13. Thus, during removal and uncoupling of the rotor, the rotor always will be released from driving connection with the motor 17 prior to removal of plug 18 from the upper end of container 13, thereby avoiding dangerous splashing of the hot oil. It of course will be understood that the shaft of motor 7 will extend into container 13 by means of conventional sealing means to avoid or substantially control the loss of the heated oil.

Discharge conduit 10 includes, at a position downstream of container 13, a normally closed discharge valve 19 which permits the oil to be drained from vessel 6 and container 13, for example if required during maintenance or repair of the apparatus.

The above described apparatus offers a number of advantages with regard to efficiency and facility of operation, compared to known arrangements. Thus, the indirect heating of the oil in combination of the forced circulation thereof ensures a uniform temperature of the oil bath and reduces the danger of overheating and degradation of the oil, with resultant advantages regarding the quality of foods fried by the oil. The arrangement of the container 13 with the associated heating and circulating means at a forward location 9 of the apparatus, and in outlet communication with expansion zone 8, as well as the location of the motor 17 below the container 13, ensure optimum accessibility of the container 13 and its connecting passages for cleaning and maintenance purposes. The telescopic mounting and coupling of the rotor to the motor and container enables the rotor to be disassembled readily. The provision of the axial coupling length of the rotor to the motor as being less than the axial length of the coupling of the rotor to the container enables disassembly of the rotor without danger to the operator.

Figure 2:
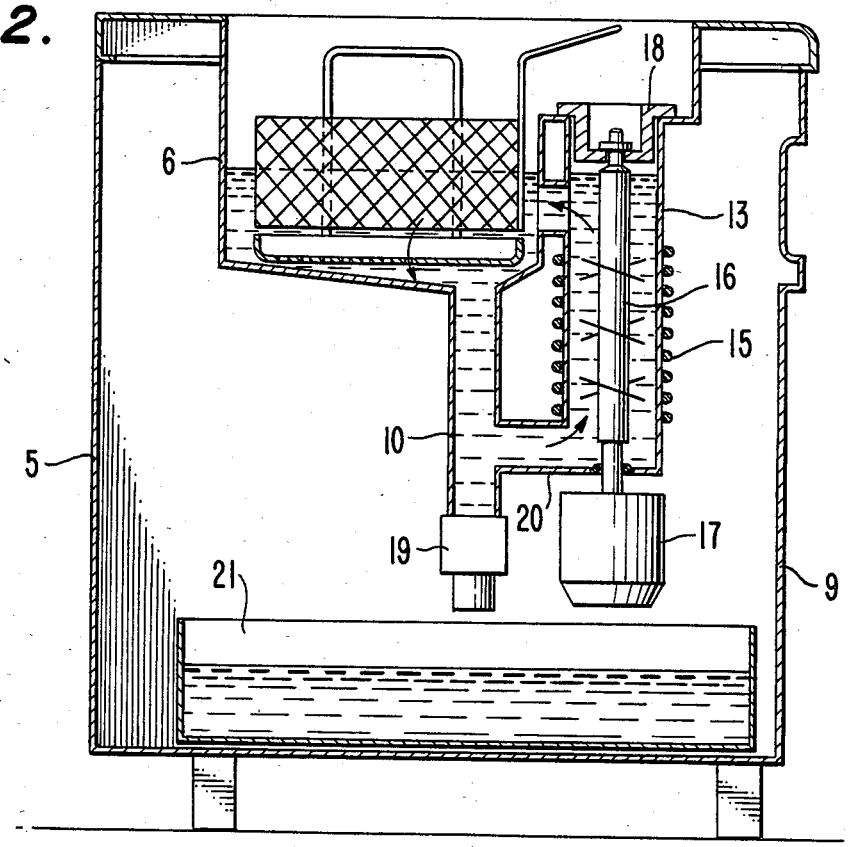
FIG. 2 is a view similar to FIG. 1 but of an alternative embodiment thereof.

FIG. 2 shows a modified embodiment of the food frying apparatus of the present invention. This embodiment differs from the embodiment of FIG. 1 in that discharge conduit 10 extends downwardly in the front portion of the fryer. Thus, oil heating container 13 no longer is connected directly to discharge conduit 20, but is connected thereto via a short inlet conduit 20. This embodiment also enables a receptacle 21 to be positioned in the lower portion of housing 5 for collecting oil discharged by opening valve 19. Compared to the embodiment of FIG. 1, the embodiment of FIG. 2 has the slight disadvantage that inlet conduit 20 is not as readily accessible for cleaning and inspection.

Figure 3:
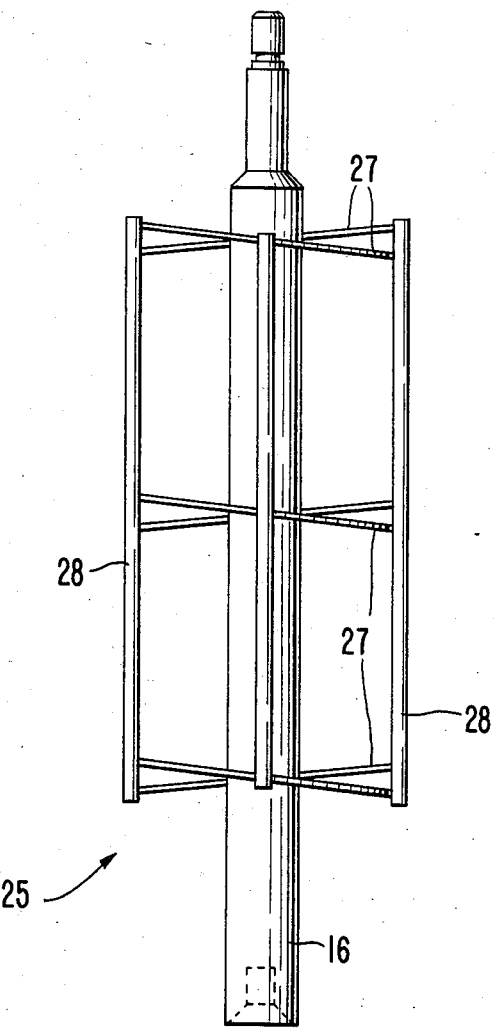
FIG. 3 is a side view of a rotor according to the present invention and employed in the embodiments of FIGS. 1 and 2.
Figure 4:
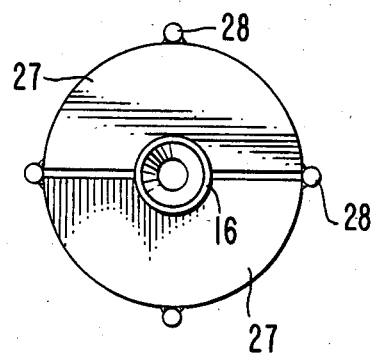
FIG. 4 is an end view of the rotor shown in FIG. 3.

In accordance with a further feature of the present invention, as shown in FIGS. 3 and 4, the rotor 25 employed in the embodiments of FIGS. 1 and 2 includes central shaft 16 having connected thereto, for example by welding, a plurality of blades or vanes 27 which extend generally radially from shaft 16. Vanes 27 are of a generally semicircular shape and are arranged in pairs opposite each other with respect to shaft 16. The vanes 27 are inclined with respect to the axis of shaft 16. The pairs of vanes are spaced equally along the length of shaft 16. In the illustrated arrangement, there are shown three pairs of vanes 28, and this number generally has been found to be sufficient for the intended purpose. However, it is intended to be within the scope of the present invention to provide a number of pairs of vanes other than three, and that the number, shape and arrangement of the vanes may be adapted to the requirements of a given frying apparatus and of the respective arrangement of heating and circulating structure.

A plurality of rods 28 are mounted to extend substantially parallel to shaft 16 and to rotate therewith at positions adjacent the inner heat exchange surface of container 13. According to a particularly simple and economical arrangement, rods 28 are connected, for example by welding, to the radially outer edges of vanes 27. In the illustrated arrangement, there are provided four rods 28, each located at a position diametrically opposite another rod with respect to shaft 16. Alternatively, rods 28 may be connected directly to shaft 16 by means of radially extending mountings. In any case, rods 28 are intended to be mounted for rotation with the remainder of the rotor structure at positions disposed adjacent the periphery of the vanes and as close as possible to the inner heat exchange wall of container 13. It will be apparent that rotor 25 obviously is of a very simple construction and is designed for simple and efficient employment in the oil heating and circulating arrangement of the present invention.

In operation, the rotor 25 exerts an efficient pumping action to achieve circulation of the oil through the heating arrangement and into the vessel 6. Rods 28 positioned peripherally of vanes 27 are effective to induce a violent turbulence in the oil flow adjacent the heat exchange wall of container 13, while the overall turbulence of the oil flow passing through container 13 remains relatively low. This arrangement minimizes the danger of oxidation of the oil due to the formation of oil bubbles, but avoids excessive heating of the oil in contact with or closely adjacent the heat exchange surface of the container, thereby preventing or at least minimizing degradation of the oil and consumption thereof. The temperature difference between the heating wall and such oil may be reduced to very low values on the order of 20° to 30° C.

Although the present invention has been described and illustrated with respect to preferred embodiments thereof, various changes and modifications as will be apparent to those skilled in the art may be made to the specifically described and illustrated features without departing from the scope of the present invention.

I claim:
1. A food frying apparatus comprising:
a housing having a front side accessible to the exterior for cleaning and maintenance;
a vessel mounted within said housing and adapted to contain oil for the frying of food, said vessel having an expansion zone adjacent said front side for containing foam resulting from frying;
an oil heating container connected to said vessel, said container being positioned adjacent said front side and being in communication with said expansion zone;
electric heating means mounted on the exterior of said container for indirectly heating oil therein;
means for forcibly circulating oil between said vessel and said container, such that oil to be heated is passed from said vessel to said container and heated oil is passed from said container to said vessel, said circulating means comprising a motor mounted beneath said container, and a rotor coaxially mounted within said container and operatively coupled to said motor to be rotated thereby within said container; and means for removably mounting said rotor within said container and coupling said rotor to said motor in a manner to ensure that said rotor is uncoupled from said motor prior to disconnection of said rotor from said container, said mounting means comprising a plug axially slidably insertable into and removable from the top of said container between closed and open positions thereof, said rotor having an upper end connected to said plug in a manner to enable relative rotation therebetween and to prevent relative axial movement therebetween, said rotor having a lower end connected to said motor in a manner to enable relative axial movement of said rotor with respect to said motor between engaged and disengaged positions and to prevent relative rotary movement therebetween in said engaged position, and the axial length of said engagement position between said motor and said lower end of said rotor being less than the axial length of movement of said plug between said closed and open positions of said container.

2. An apparatus as claimed in claim 1, wherein said vessel further includes a discharge conduit extending from the bottom of said vessel and having a valve for controlling the discharge of oil from said vessel.

3. An apparatus as claimed in claim 2, wherein said vessel bottom converges downwardly toward said discharge conduit, and further comprising a filter above the said discharge conduit.

4. An apparatus as claimed in claim 2, wherein said vessel and said container are connected by upper and lower passages, and said lower passage includes at least a portion of said discharge conduit.

5. An apparatus as claimed in claim 4, wherein oil to be heated passes from said vessel to said container through said lower passage, and heated oil passes from said container to said vessel through said upper passage.

6. An apparatus as claimed in claim 5, wherein said upper passage opens into said vessel at a position below the level of oil therein.

7. An apparatus as claimed in claim 1, wherein said rotor comprises a central shaft, a plurality of vanes connected to said shaft and extending radially therefrom, and a plurality of rods mounted to extend substantially parallel to said shaft and to rotate therewith at positions closely adjacent an inner surface of said container.

8. An apparatus as claimed in claim 7, wherein said rods are connected to said vanes.

9. An apparatus as claimed in claim 8, wherein said rods are connected to radially outer edges of said vanes.

10. An apparatus as claimed in claim 7, wherein said vanes are of generally semicircular shape and are arranged in pairs opposite each other with respect to said shaft.

11. An apparatus as claimed in claim 10, wherein said vanes are inclined with respect to the axis of said shaft.

12. An apparatus as claimed in claim 10, wherein said pairs of vanes are spaced equally along the length of said shaft.

13. An apparatus as claimed in claim 7, wherein said rods are positioned at locations diametrically opposite each other with respect to the axis of said shaft.

* * * * *